United States Patent
Nelson

(10) Patent No.: US 10,418,796 B2
(45) Date of Patent: Sep. 17, 2019

(54) CABLE STRIPPER

(71) Applicant: Southwire Company, LLC, Carrollton, GA (US)

(72) Inventor: Travis Nelson, Phoenix, AZ (US)

(73) Assignee: Southwire Company, LLC, Carrollton, GA (US)

( * ) Notice: Subject to any disclaimer, the term of this patent is extended or adjusted under 35 U.S.C. 154(b) by 241 days.

(21) Appl. No.: 15/464,374

(22) Filed: Mar. 21, 2017

(65) Prior Publication Data
US 2017/0279254 A1 Sep. 28, 2017

Related U.S. Application Data

(60) Provisional application No. 62/313,755, filed on Mar. 27, 2016.

(51) Int. Cl.
*H02G 1/12* (2006.01)

(52) U.S. Cl.
CPC ......... *H02G 1/1226* (2013.01); *H02G 1/1224* (2013.01)

(58) Field of Classification Search
CPC ... H02G 1/1226; H02G 1/1224; H02G 1/1212
See application file for complete search history.

(56) References Cited

U.S. PATENT DOCUMENTS

| | | |
|---|---|---|
| 3,361,015 A | 1/1968 | Matthews |
| 3,881,249 A | 5/1975 | Cox, Jr. |
| 4,366,619 A | 1/1983 | Bieganski |
| 4,472,877 A | 9/1984 | Undin et al. |
| 4,526,068 A | 7/1985 | Undin et al. |
| 4,640,009 A | 2/1987 | Liversidge |
| 4,766,672 A | 8/1988 | Undin et al. |
| D297,910 S | 10/1988 | Mathews |
| 5,009,130 A | 4/1991 | Bieganski |
| 5,345,681 A | 9/1994 | Undin |
| 5,381,601 A | 1/1995 | Danter et al. |
| 5,398,413 A | 3/1995 | Chen |

(Continued)

FOREIGN PATENT DOCUMENTS

| | | |
|---|---|---|
| CN | 204190283 U | 3/2015 |
| GB | 2215143 A1 | 9/1989 |

(Continued)

OTHER PUBLICATIONS

International Search Report dated Jun. 27, 2017 cited in Application No. PCT/US2017/023412, 14 pgs.

*Primary Examiner* — David B. Thomas
(74) *Attorney, Agent, or Firm* — Merchant & Gould P.C.

(57) ABSTRACT

A cable stripper may be provided. The cable stripper may comprise a stripper body, a trigger assembly, a cable support body, and a blade. The trigger assembly may be slidably engaged within the stripper body. The trigger assembly may comprise a trigger assembly block. The cable support body may be attached to the stripper body. The blade may be attached to a front of the stripper body and enclosed by the cable support body. The blade may extend into a cable opening in the apparatus. The trigger assembly block may press a cable against the blade. The cable may be in the cable opening. The blade may extend into a jacket of the cable without extending to a conductor of the cable.

15 Claims, 10 Drawing Sheets

(56) References Cited

U.S. PATENT DOCUMENTS

| | | | |
|---|---|---|---|
| 6,058,606 A | 5/2000 | Hepworth | |
| 6,073,349 A | 6/2000 | Liversidge | |
| 6,334,253 B1 | 1/2002 | Cheng | |
| 6,581,291 B1 | 6/2003 | Tarpill et al. | |
| D481,607 S | 11/2003 | Ahlgren et al. | |
| 6,910,275 B2 | 6/2005 | Tapper | |
| 7,003,883 B2 | 2/2006 | Tapper | |
| 7,137,204 B2 | 11/2006 | Wiste | |
| 9,425,593 B2 * | 8/2016 | Lin | H02G 1/1224 |
| 9,887,522 B2 * | 2/2018 | Burris | H02G 1/1224 |
| 10,050,421 B2 * | 8/2018 | Lin | H02G 1/1224 |
| 2003/0110637 A1 | 6/2003 | Tapper | |

FOREIGN PATENT DOCUMENTS

| | | | |
|---|---|---|---|
| GB | 2229324 A1 | 9/1990 | |
| WO | 8002345 A1 | 10/1980 | |

\* cited by examiner

US 10,418,796 B2

CABLE STRIPPER

RELATED APPLICATION

Under provisions of 35 U.S.C. § 119(e), Applicant claims the benefit of U.S. Provisional Application No. 62/313,755 filed Mar. 27, 2016, which is incorporated herein by reference in its entirety.

BACKGROUND

A wire stripper is a pair of opposing blades much like scissors or wire cutters. The addition of a center notch makes it easier to cut insulation from a wire without cutting the wire. Another type of wire stripper is very similar to the one previously mentioned, except this type has several notches of varying size. This allows a user to match a notch size to a wire size. Once this wire stripper is clamped on, the remainder of the wire can simply be pulled out, leaving the insulation behind.

BRIEF DESCRIPTION OF THE FIGURES

The accompanying drawings, which are incorporated in and constitute a part of this disclosure, illustrate various embodiments of the present disclosure. In the drawings.

DETAILED DESCRIPTION

Overview

Figure 1C:
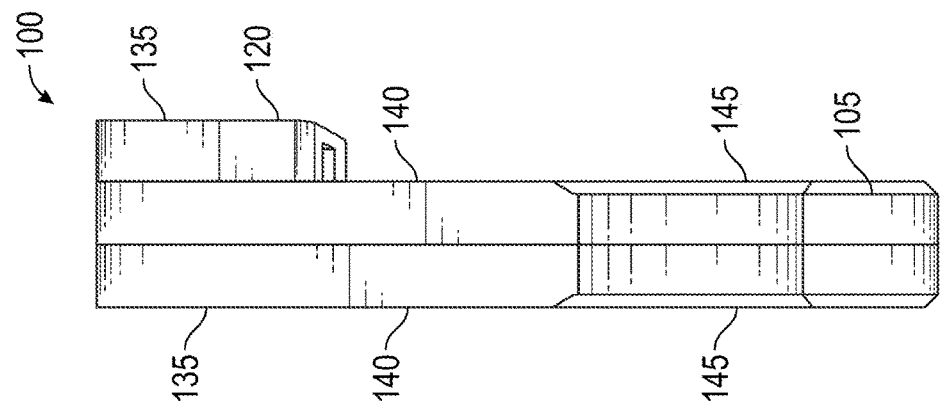
FIG. 1A, FIG. 1B, and FIG. 1C show a cable stripper.

A cable stripper may be provided. The cable stripper may comprise a stripper body, a trigger assembly, a cable support body, and a blade. The trigger assembly may be slidably engaged within the stripper body. The trigger assembly may comprise a trigger assembly block. The cable support body may be attached to the stripper body. The blade may be attached to a front of the stripper body and enclosed by the cable support body. The blade may extend into a cable opening in the apparatus. The trigger assembly block may press a cable against the blade. The cable may be in the cable opening. The blade may extend into a jacket of the cable without extending to a conductor of the cable.

Both the foregoing overview and the following example embodiments are examples and explanatory only, and should not be considered to restrict the disclosure's scope, as described and claimed. Further, features and/or variations may be provided in addition to those set forth herein. For example, embodiments of the disclosure may be directed to various feature combinations and sub-combinations described in the example embodiments.

Example Embodiments

The following detailed description refers to the accompanying drawings. Wherever possible, the same reference numbers are used in the drawings and the following description to refer to the same or similar elements. While embodiments of the disclosure may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the disclosure. Instead, the proper scope of the disclosure is defined by the appended claims.

Embodiments of the disclosure may comprise a cable stripper. When it comes to stripping smaller circuit sizes of cable, there may be a need for a tool that has a range to cover smaller sizes, for example, for sizes #8 AWG through 1/0 AWG inclusively. Embodiments of the disclosure may not require adjustments. In other words, with embodiments of the disclosure, the cable may be inserted into the cable stripper and the cable stripper may be spun around the cable lifting and separating the insulation from the conductor while giving a clean nick free strip, for example. Embodiments of the disclosure may improve safety for cable stripping operations by eliminating the use of razors or knives for stripping cable insulation. In addition, embodiments of the disclosure may prevent scoring of conductors within the stripped cable.

Figure 1B:
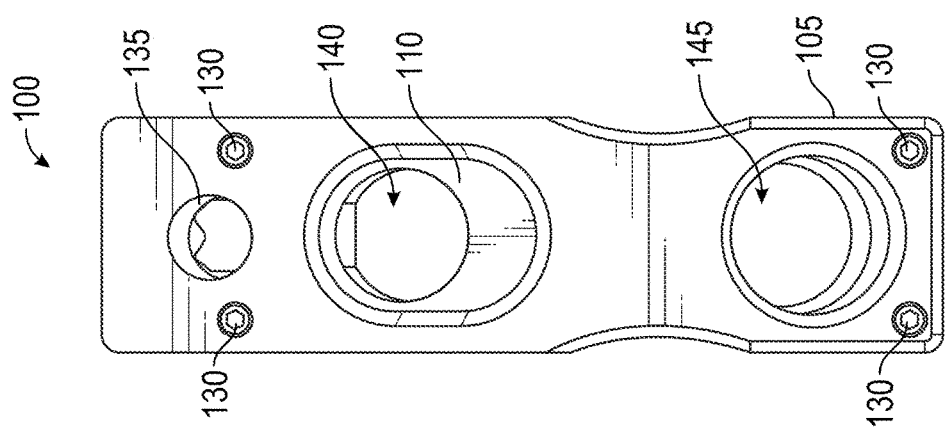
Figure 1A:
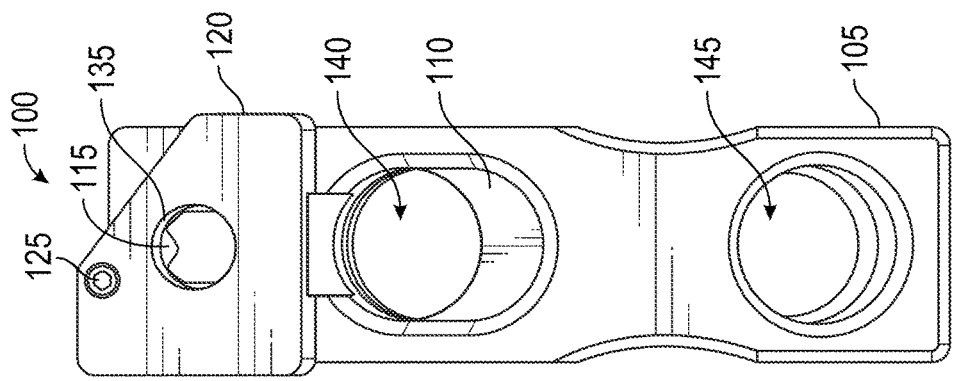

FIG. 1A, FIG. 1B, and FIG. 1C show a cable stripper 100. FIG. 1A shows a front of cable stripper 100, FIG. 1B shows a back of cable stripper 100, and FIG. 1C shows a side of cable stripper 100. As shown in FIG. 1A, FIG. 1B, and FIG. 1C, cable stripper 100 may comprise a stripper body 105, a trigger assembly 110, a blade 115, and a cable support body 120. A cable support body fastener 125 may attach cable support body 120 to stripper body 105. Stripper body fasteners 130 may hold stripper body 105 together as described in greater detail below. Cable stripper 100 may further comprise a cable opening 135, a stripper body trigger opening 140, and a stripper opening 145, which may be used in the operation cable stripper 100 as described in greater detail below.

Figure 2:
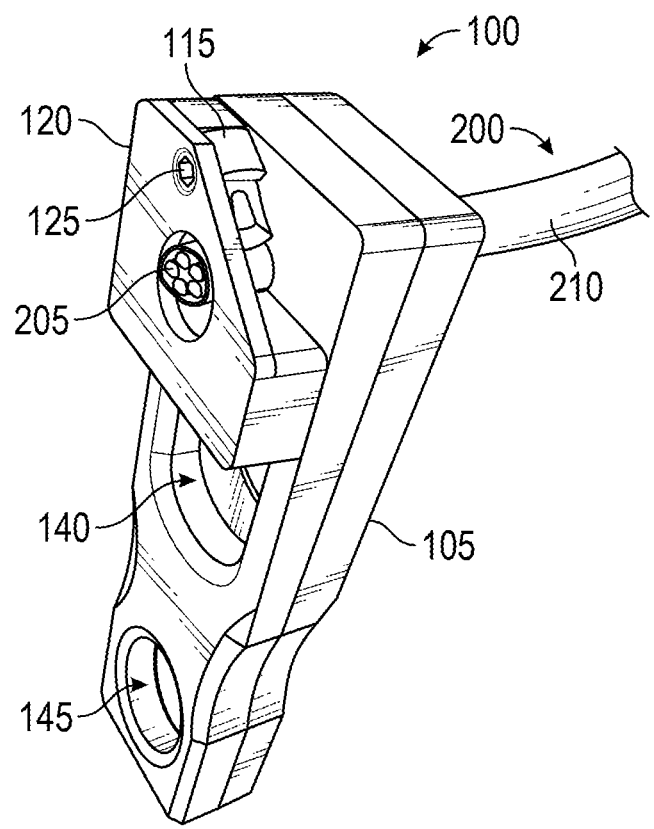
FIG. 2 shows an isometric view of a cable stripper.

FIG. 2 shows an isometric view of cable stripper 100. As shown in FIG. 2, a cable 200 may be inserted in cable opening 135. Cable 200 may comprise a conductor 205 and a jacket 210. As will be described in greater detail below, a user may insert a finger in stripper body trigger opening 140 and slide trigger assembly 110 downward. After the user slides slide trigger assembly 110 downward, the user may insert cable 200 in cable opening 135 and release slide trigger assembly 110. After slide trigger assembly 110 is released, blade 115 may engage jacket 210 of cable 200.

Figure 3:
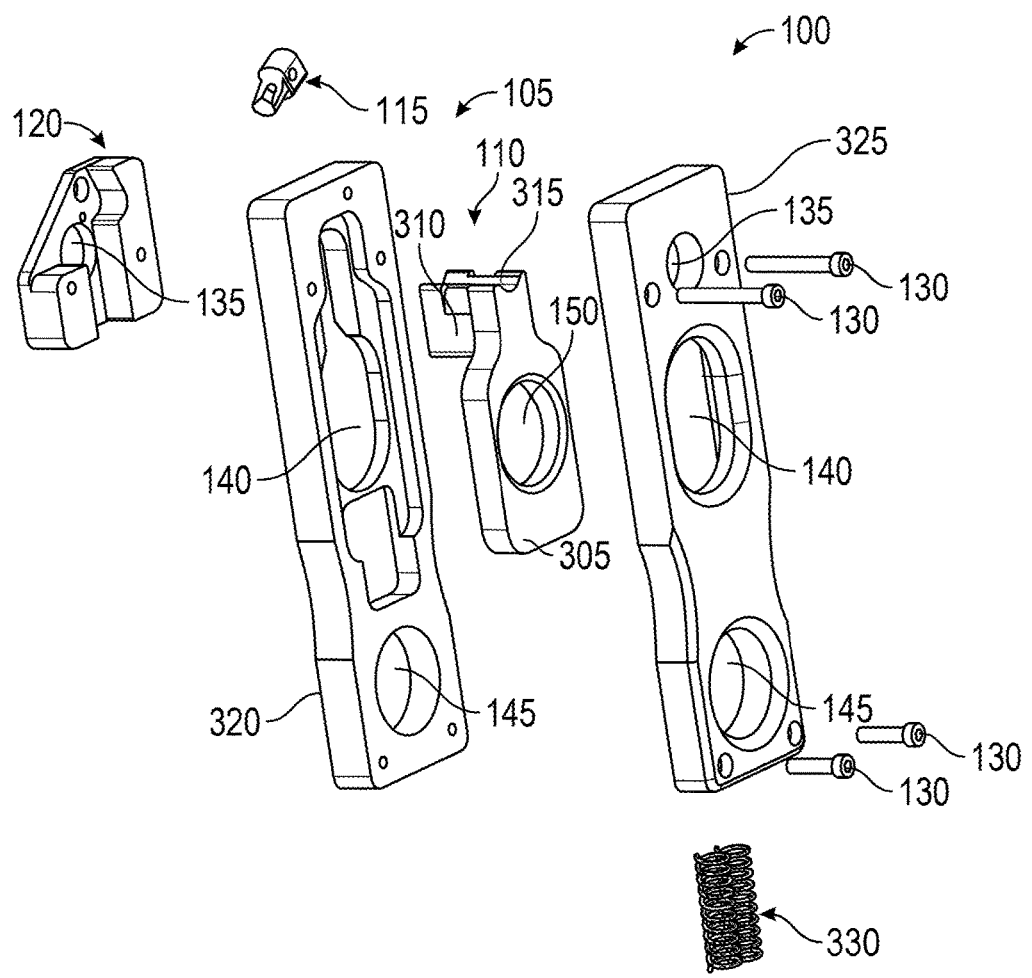
FIG. 3 shows an exploded view of a cable stripper.

FIG. 3 shows an exploded view of cable stripper 100. As shown in FIG. 1, trigger assembly 110 may comprise a trigger assembly trigger 305 and a trigger assembly block 310. Trigger assembly block 310 may comprise a saddle surface 315. Stripper body 105 may comprise a front housing 320 and a back housing 325. Front housing 320 and back housing 325 may be held together by stripper body fasteners 130. A spring 330 may be used to drive trigger assembly 110. For example, when the user slides slide trigger assembly 110 downward, spring 330 may be charged. After slide trigger assembly 110 is released by the user, spring 330 may be discharged. Slide trigger assembly 110 may slide within stripper body 105 in a cavity defined by front housing 320 and back housing 325. Spring 330 may provide a pressure of, but not limited to, 35.3 lbs./in to drive trigger assembly 110. However, the pressure of spring 330 may range between 25 lbs./in and 50 lbs./in.

Figure 4:
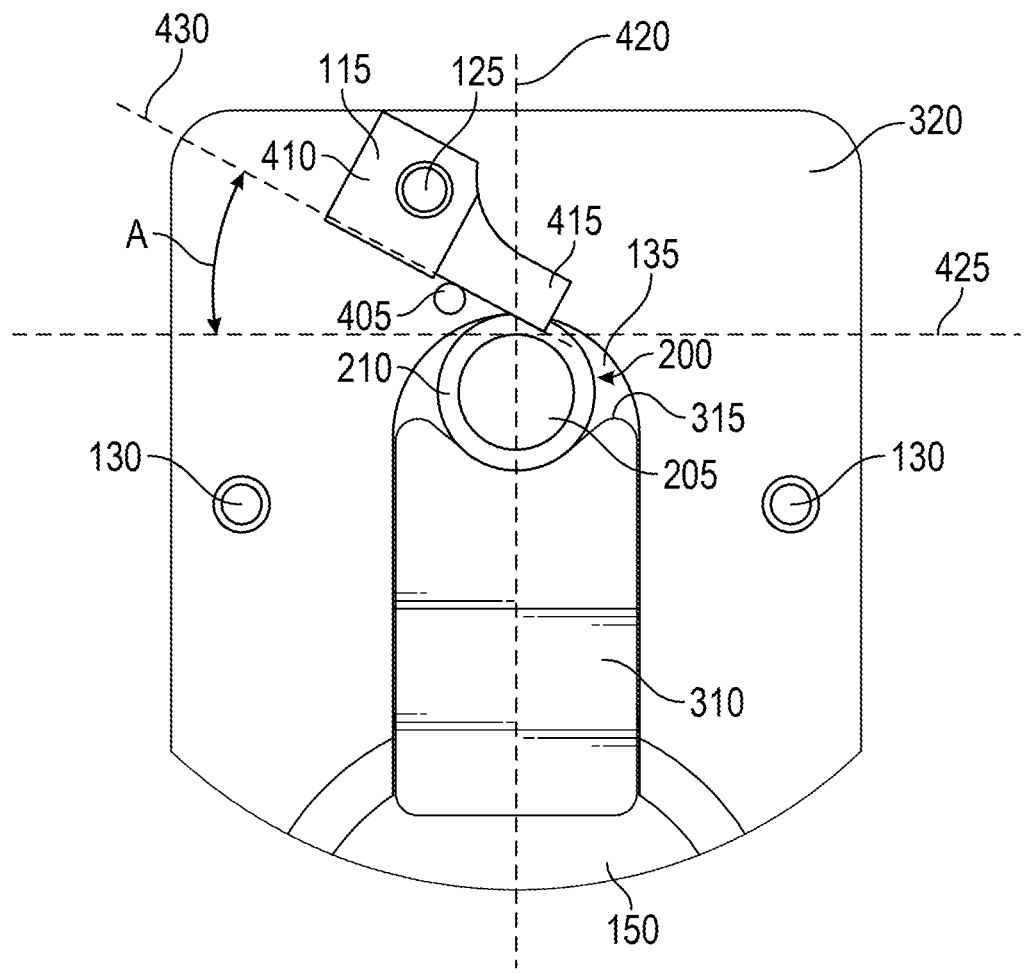
FIG. 4 shows a view of an upper portion of a front housing of a cable stripper.
Figure 5A:
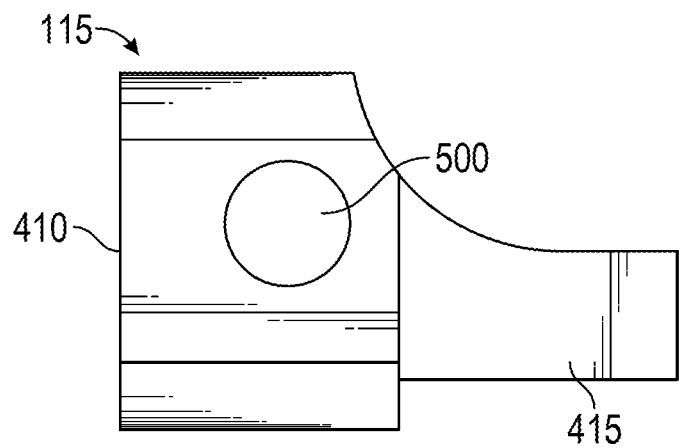
FIGS. 5A through 5D show a blade.
Figure 5B:
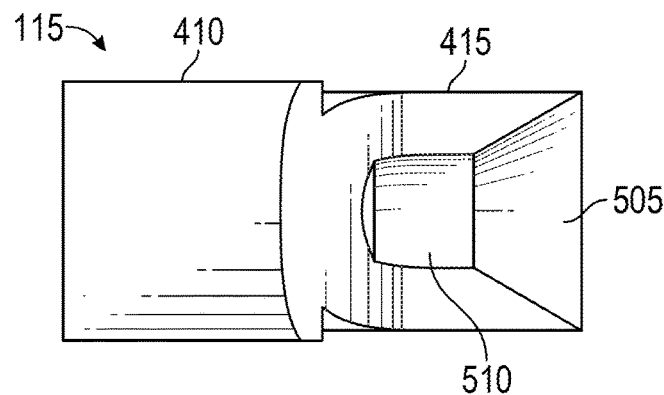
Figure 5C:
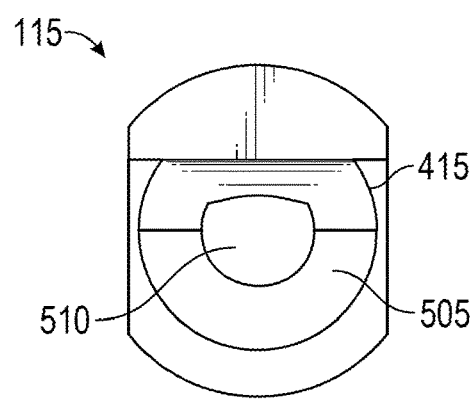
Figure 5D:
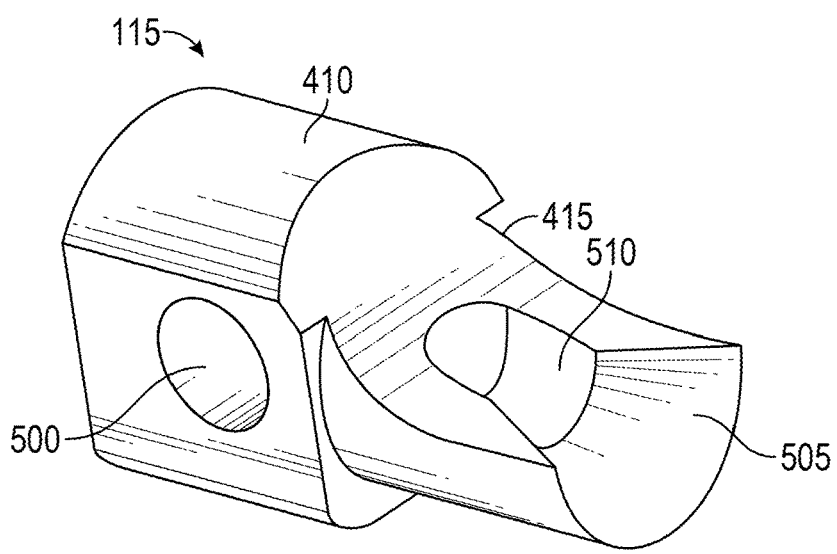

FIG. 4 shows a view of an upper portion of front housing 320 of cable stripper 100. In the view shown in FIG. 4, slide trigger assembly 110 has been released and blade 115 has engaged jacket 210 of cable 200. As shown in FIG. 4, due to a force caused by the discharge of spring 330, saddle surface 315 of trigger assembly block 310 may be pressing cable 200 against an upper interior surface of cable opening 135. Consequently, blade 115, extending into cable opening 135, may cut into jacket 210 of cable 200. Blade 115 may cut into jacket 210 of cable 200; however, blade 115 may not make contact with conductor 205 of cable 200.

As shown in FIG. 4, a stop 405 may stop blade 115 and keep blade 115 from extending all the way through jacket 210 to conductor 205. Stop 405 may extend into the front of front housing 320. Blade 115 may comprise a main block 410 and a scoop 415. Line of symmetry 420 may pass through stripper body 105. Cable 200 and stripper body 105 may be symmetric about line of symmetry 420. First line 425 may be perpendicular to line of symmetry 420. Second line 430 may pass along a bottom edge of scoop 415. An angle A may be formed between first line 425 and second line 430. Angle A may comprise, but is not limited to, 12.9 degrees and may range between 10 degrees and 15 degrees.

Figure 6A:
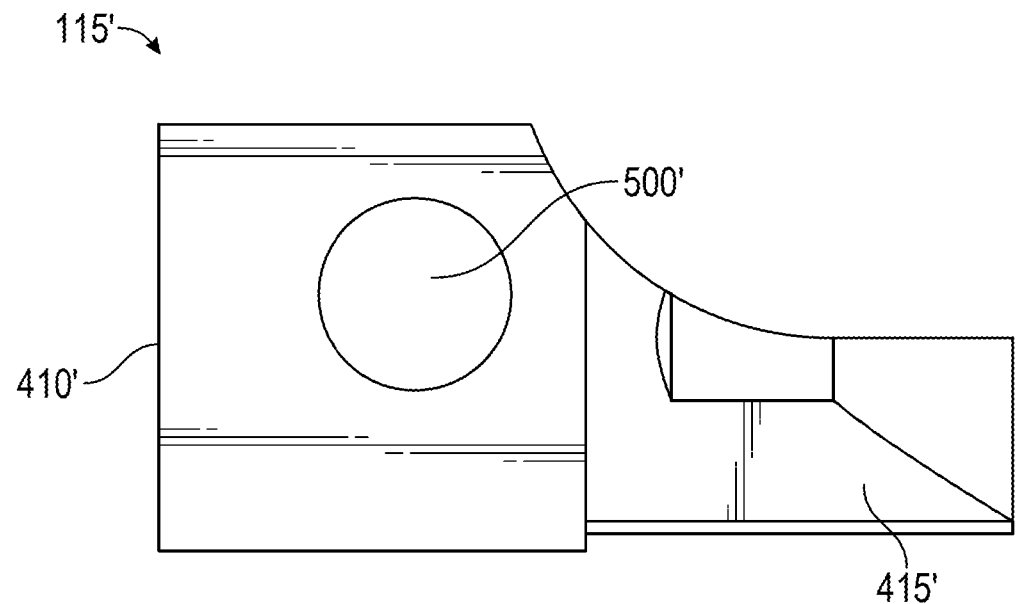
FIG. 6A and FIG. 6B show a blade.
Figure 6B:
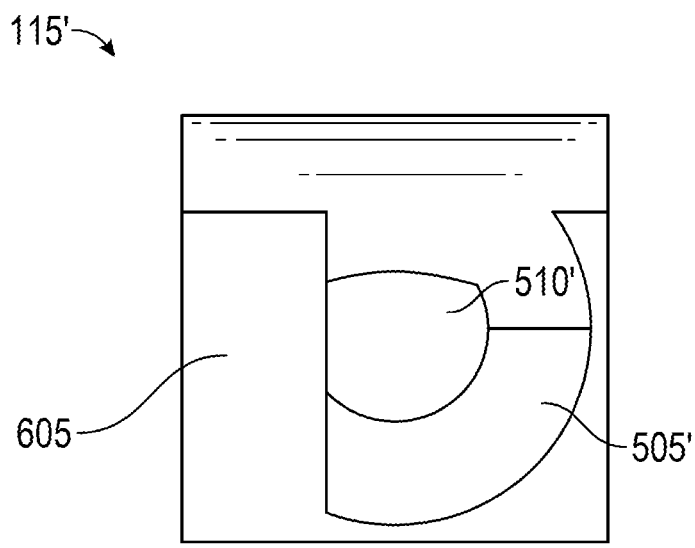

FIG. 5A, FIG. 5B, FIG. 5C, and FIG. 5D show blade 115 in more detail. As shown in FIG. 5A, FIG. 5B, FIG. 5C, and FIG. 5D, blade 115 may comprise a blade opening 500 through which cable support body fastener 125 may extend. Scoop 415 of blade 115 may comprise a tapered portion 505 and blade cavity 510. Tapered portion 505 may have a rounded bottom and may be sharped in order to cut into jacket 210. FIG. 6A and FIG. 6B show another embodiment of blade 115. As shown in FIG. 6A and FIG. 6B, blade 115' may comprise a main block 410' and a scoop 415'. Scoop 415' of blade 115' may comprise a tapered portion 505' and blade cavity 510'. Tapered portion 505' may have a rounded bottom and may be sharped in order to cut into jacket 210. As compared to scoop 415, scoop 415' may be similar to scoop 415 with a portion of tapered portion 505 removed (i.e. an open volume 605). Blade 115' may be used in applications where a portion of jacket 210 is to be removed from cable 200 in mid span, for example, to apply a grounding lug to conductor 205. The shape of scoop 415' may allow for a cleaner cut into the mid span of cable 200.

Figure 7A:
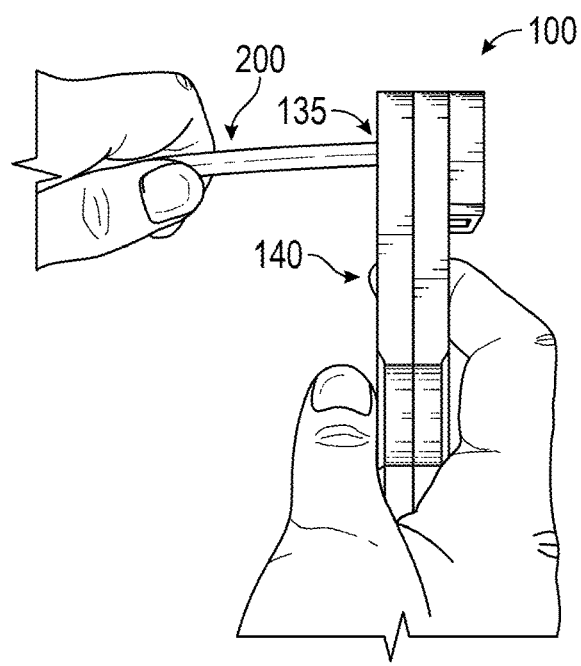
FIGS. 7A through 7H illustrate the operation of a cable stripper.
Figure 7B:
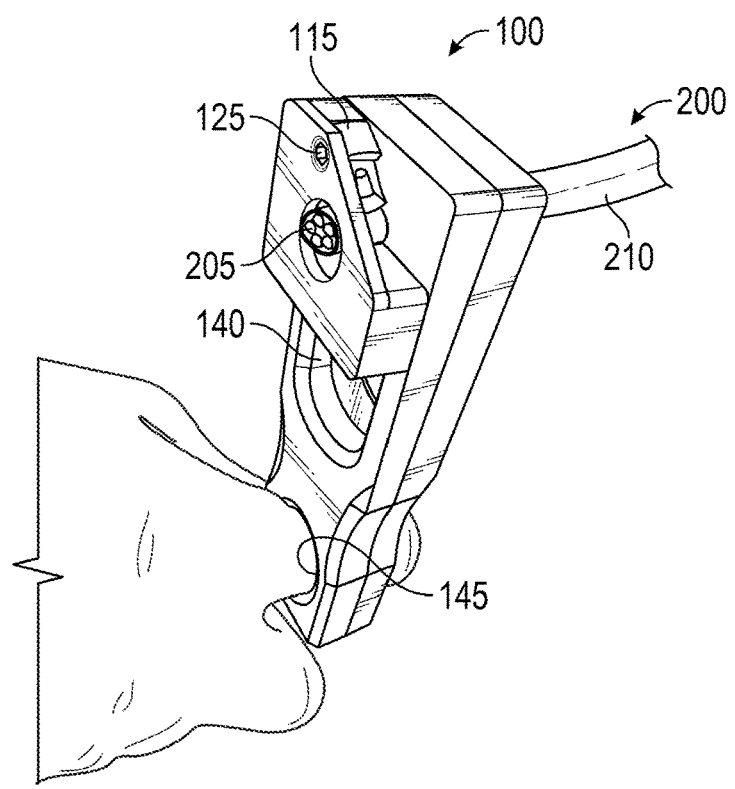

FIGS. 7A through 7H illustrate the operation of cable stripper 100. As shown in FIG. 7A, the user may select an appropriate size (e.g., #6 AWG through 1/0 AWG) for cable 200. The user may ensure the end of cable 200 is substantially rounded. Then the user may insert a finger in stripper body trigger opening 140 (and trigger assembly opening 150) and pull down on trigger assembly trigger 305 with the finger thus charging spring 330. This allows cable opening 135 to be unobscured by trigger assembly block 310. With cable opening 135 being unobscured by trigger assembly block 310, the user may insert cable 200 into the back side of cable stripper 100 into cable opening 135 while holding down on trigger assembly trigger 305 loaded by spring 330. For sizes smaller sizes (e.g., #6 AWG through #4 AWG), cable 200 may be inserted until it is flush with the front of cable support body 120 (as shown in FIG. 7B). For Larger sizes (e.g., #3 AWG through 1/0 AWG), cable 200 may be inserted until the edge of jacket 210 is in the center of blade 115. This may be done because the smaller sizes may need the support of cable support body 120, while the larger sizes may not.

After the user inserts cable 200 into the back side of cable stripper 100 into cable opening 135, the user may release trigger assembly trigger 305 thus discharging spring 330. At this point, cable 200 may be in the position shown in FIG. 4. For example, a top of cable 200 may be firmly pressed against the upper interior surface of cable opening 135 by trigger assembly block 310 with saddle surface 315 firmly pressed against a bottom of cable 200. As the user releases trigger assembly trigger 305, scoop 415 of blade 115 may cut into jacket 210 of cable 200. However, scoop 415 of blade 115 may not cut all the way down to conductor 205. In other words, scoop 415 may cut into jacket 210, but may not make contact with conductor 205. Once the user releases trigger assembly trigger 305, cable 200 may be securely in place within cable stripper 100.

Figure 7C:
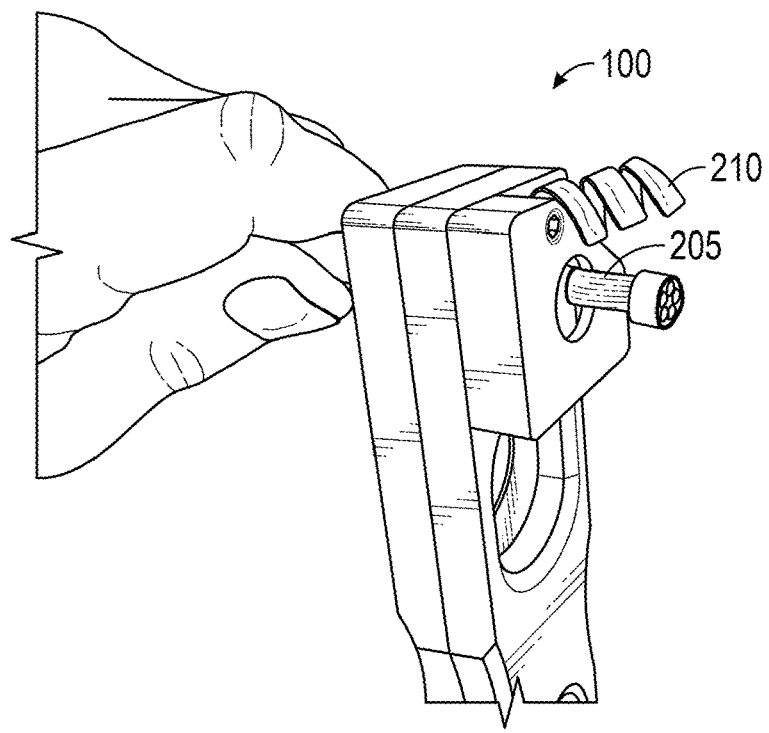

As shown in FIG. 7B, once cable 200 is securely in place within cable stripper 100, the user may insert a finger of one hand into the front of stripper opening 145 of cable stripper 100 while holding cable 200 with the other hand. With the finger in the front of stripper opening 145, the user may rotate (e.g., clockwise) cable stripper 100 into cable 200 while applying forward pressure on cable stripper 100 toward cable 200. The user may ensure that enough forward pressure is applied to cable stripper 100 to allow cable stripper 100 to advance into and spiral around cable 200 thus lifting and separating jacket 210 from conductor 205 without nicking conductor 205. The user may continue to rotate cable stripper 100 around cable 200 until a desired length of jacket 210 is stripped from cable 200 as shown in FIG. 7C.

Figure 7D:
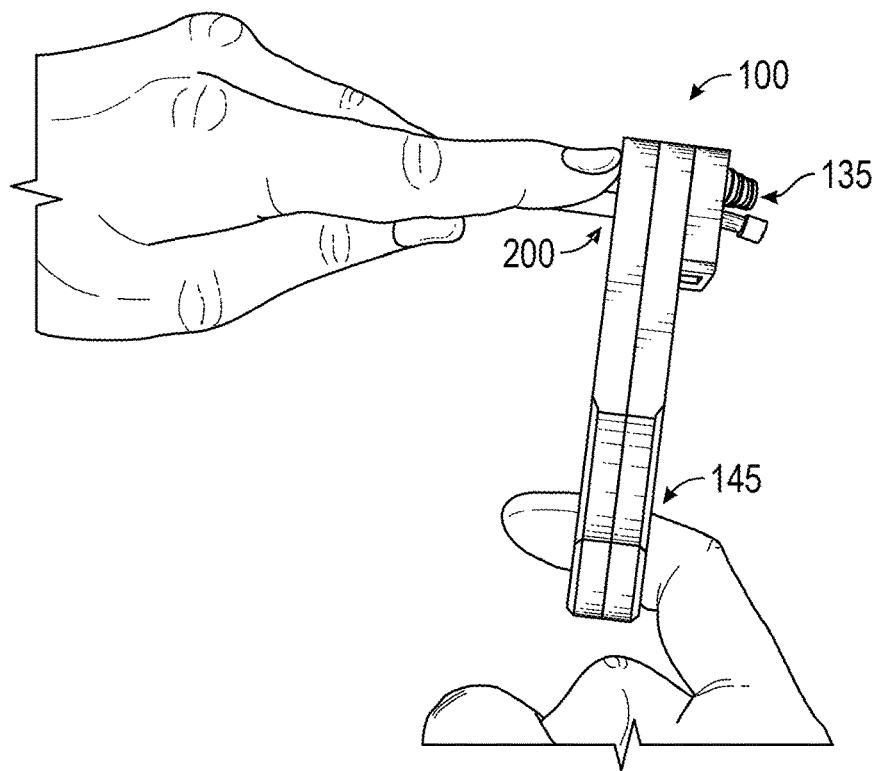
Figure 7E:
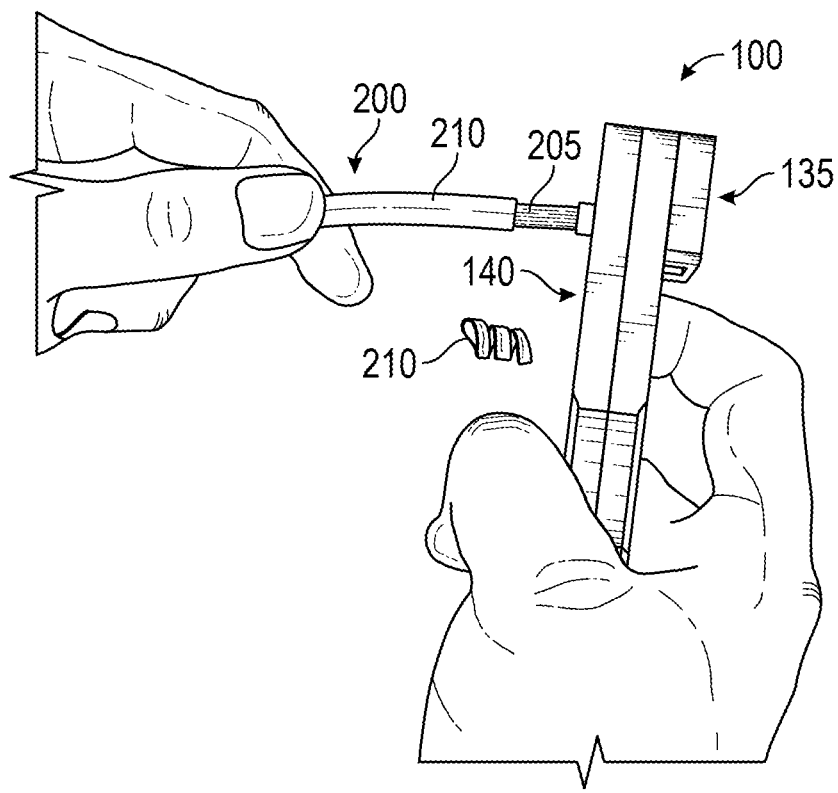
Figure 7F:
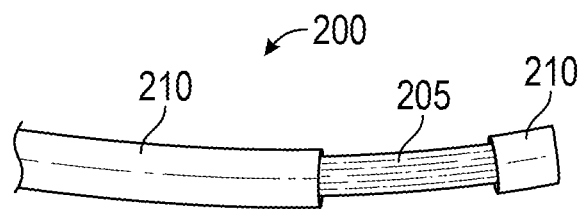
Figure 7G:
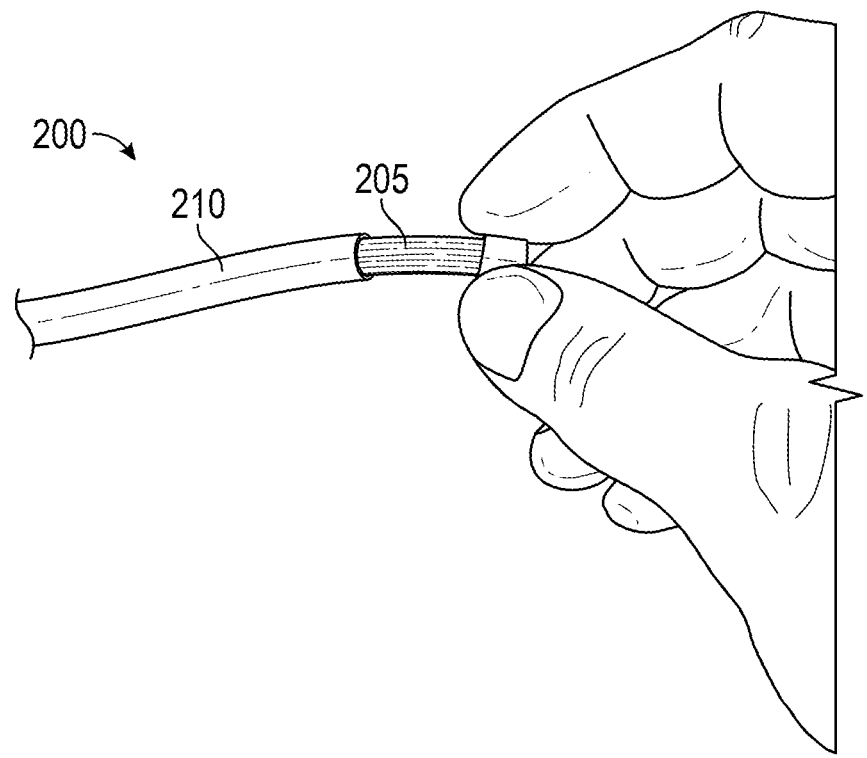
Figure 7H:
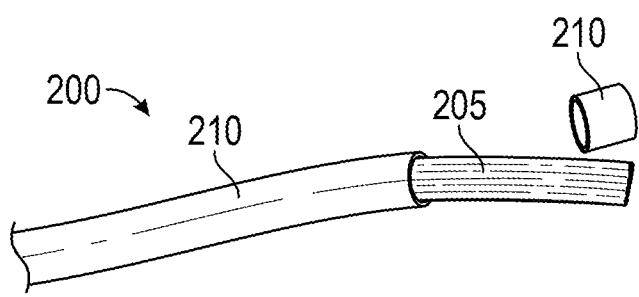

As shown in FIG. 7D, once the desired length of jacket 210 is stripped from cable 200, the user may slide a finger of the other hand (e.g., the hand holding cable 200) against the back side of cable stripper 100 to stop the advancement of cable stripper 100 along cable 200. With the finger of the other hand against the back side of cable stripper 100, the user may continue to rotate cable stripper 100 around cable 200 until the stripped jacket material is rounded off of cable 200. With the stripped jacket material rounded off of cable 200, the user may remove the finger from stripper opening 145 and reinsert the finger in stripper body trigger opening 140 (and trigger assembly opening 150) and pull down on trigger assembly trigger 305 with the finger thus charging spring 330. With trigger assembly block 310 no longer securing cable 200, cable 200 may be removed from cable opening 135 as shown in FIG. 7E. In some applications, there may a little material of jacket 210 left on an end of cable 200. In this case, the user may slide this material of jacket 210 off with the user's fingers as shown in FIG. 7F, FIG. 7G, and FIG. 7H.

Embodiments of the present disclosure, for example, are described above with reference to block diagrams and/or operational illustrations of methods, systems, and computer program products according to embodiments of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

While the specification includes examples, the disclosure's scope is indicated by the following claims. Furthermore, while the specification has been described in language specific to structural features and/or methodological acts, the claims are not limited to the features or acts described above. Rather, the specific features and acts described above are disclosed as example for embodiments of the disclosure.

What is claimed is:
1. An apparatus comprising:
   a stripper body;
   a cable opening extending through the stripper body;
   a trigger assembly slidably engaged within the stripper body, the trigger assembly comprising a trigger assembly block; and a blade, wherein the blade comprises;
  a main block, and
  a scoop, wherein the blade is attached to the stripper body, the blade extending into the cable opening, the trigger assembly block being configured to press a cable in the cable opening against the blade, wherein the trigger assembly block being configured to press the cable in the cable opening against the blade comprises the trigger assembly block being configured to press the cable in the cable opening against the blade wherein the blade extends into a jacket of the cable without extending to a conductor of the cable.

2. The apparatus of claim 1, further comprising a cable support body attached to the stripper body, the cable opening extending through the cable support body, the cable support being configured to support the cable in the cable opening.

3. The apparatus of claim 2, wherein the blade is enclosed by the cable support body.

4. The apparatus of claim 3, wherein the blade is attached to a front of the stripper body.

5. The apparatus of claim 1, further comprising a spring configured to apply a pressure on the trigger assembly, the pressure being configured to cause the trigger assembly block to press the cable in the cable opening against the blade.

6. The apparatus of claim 1, wherein the scoop comprises a tapered portion and a blade cavity.

7. The apparatus of claim 6, wherein the tapered portion comprises a rounded bottom.

8. The apparatus of claim 7, wherein the rounded bottom is sharpened.

9. The apparatus of claim 6, wherein the tapered portion comprises an open volume.

10. The apparatus of claim 1, further comprising:
  a stripper opening; and
  a stripper body trigger opening disposed between the stripper opening and the cable opening.

11. An apparatus comprising:
  a stripper body;
  a cable opening extending through the stripper body;
  a trigger assembly slidably engaged within the stripper body, the trigger assembly comprising a trigger assembly block;
  a spring configured to apply a pressure on the trigger assembly;
  a cable support body attached to the stripper body; and
  a blade attached to a front of the stripper body and enclosed by the cable support body, the blade extending into the cable opening, the blade comprising;
  a main block, and
  a scoop.

12. The apparatus of claim 11, wherein the scoop comprises a tapered portion and a blade cavity.

13. The apparatus of claim 12, wherein the tapered portion comprises a rounded bottom.

14. The apparatus of claim 13, wherein the rounded bottom is sharpened.

15. The apparatus of claim 12, wherein the tapered portion comprises an open volume.

* * * * *